UNITED STATES PATENT OFFICE.

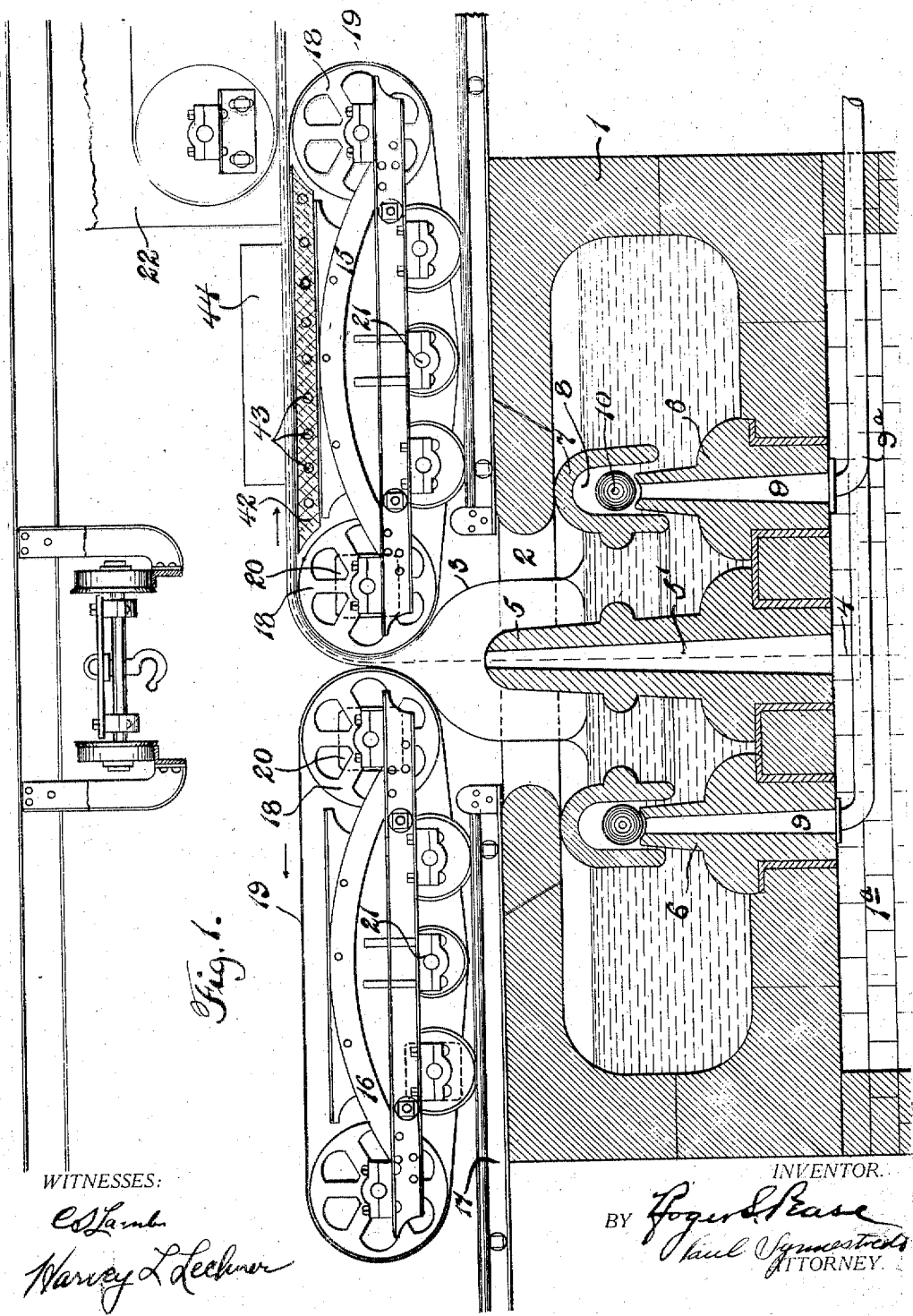

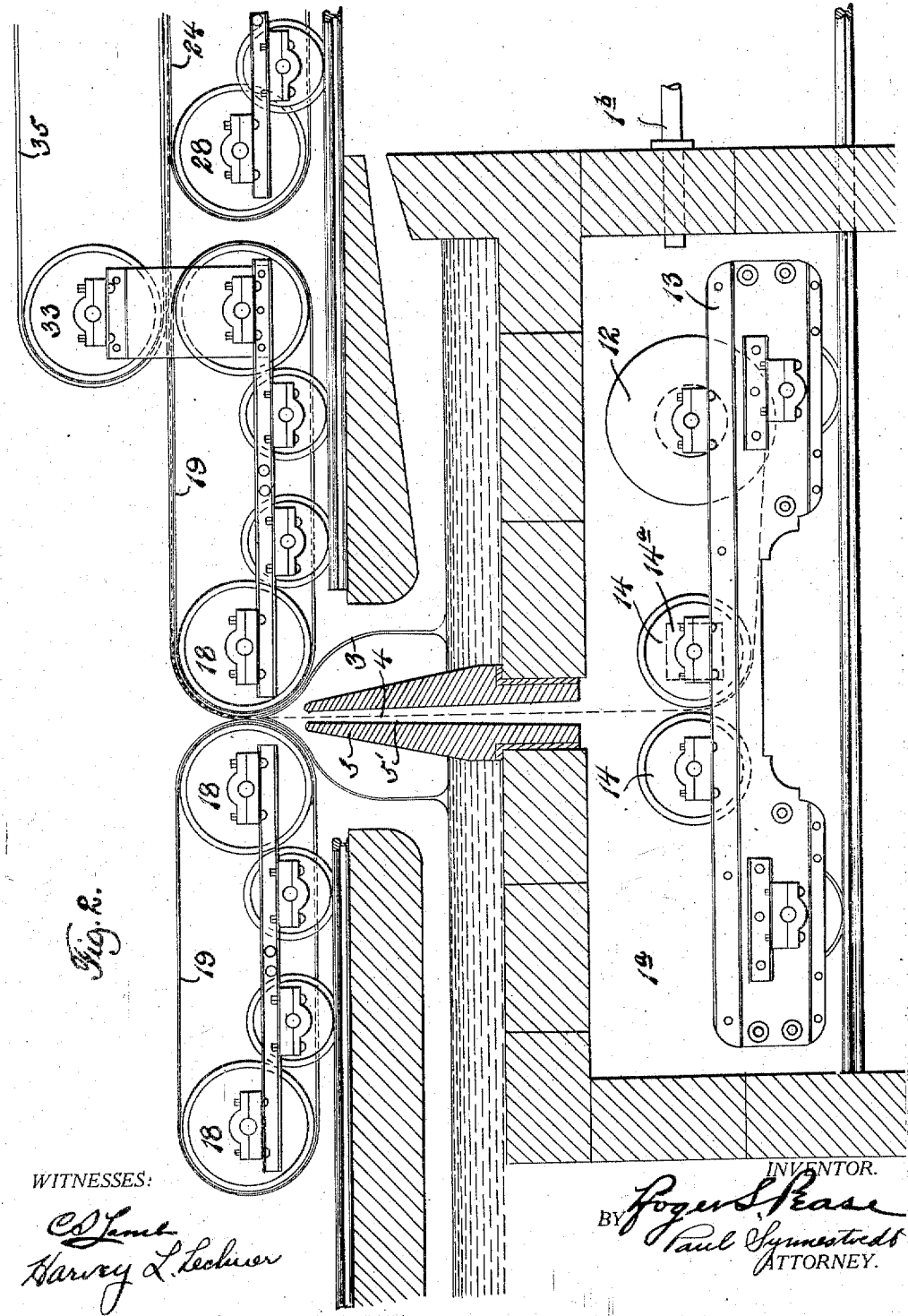

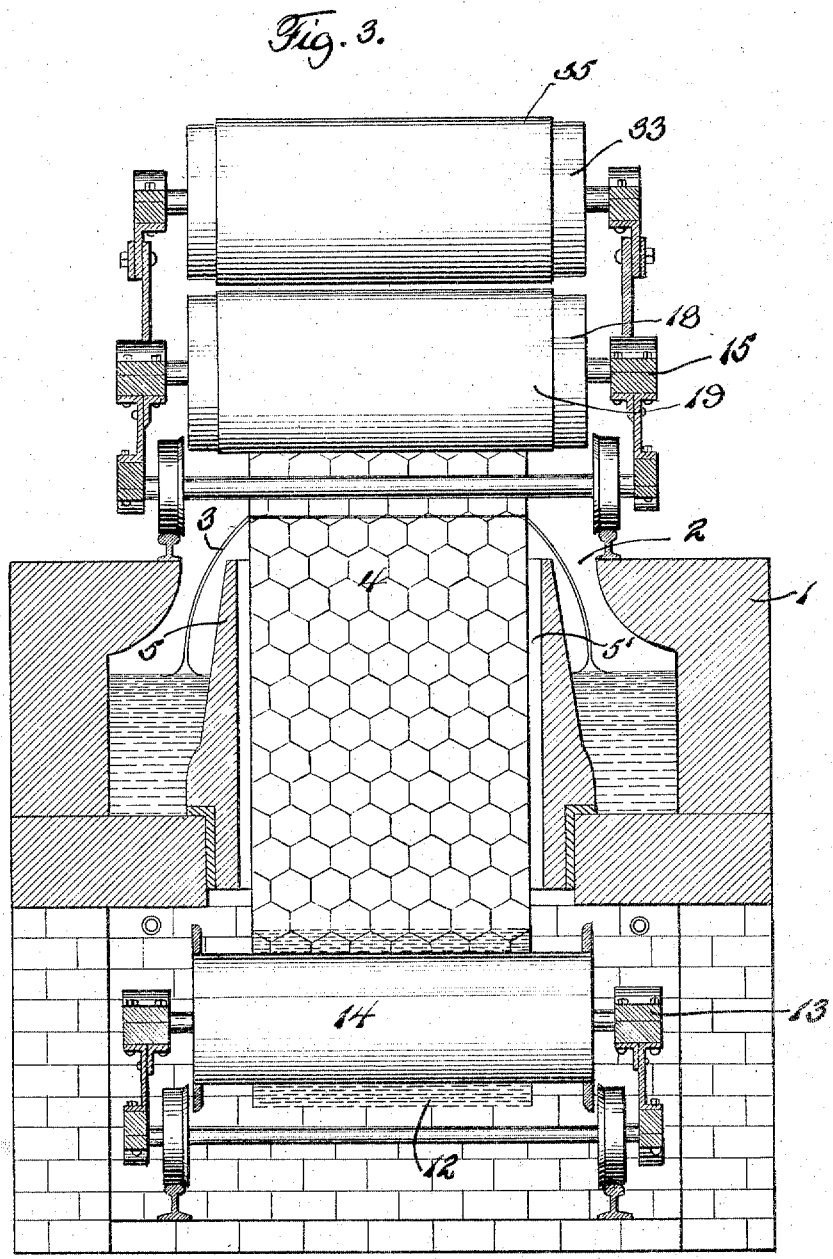

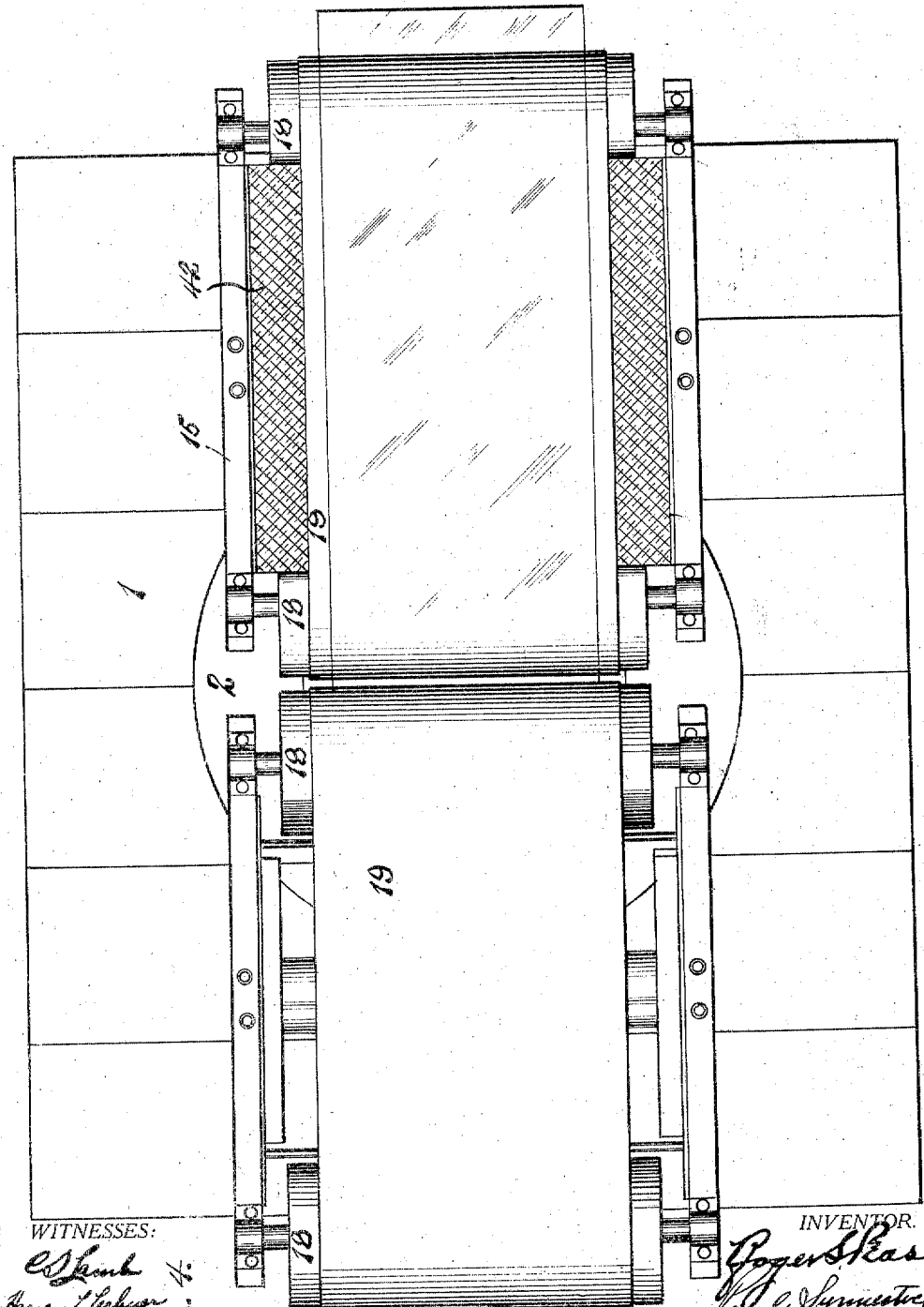

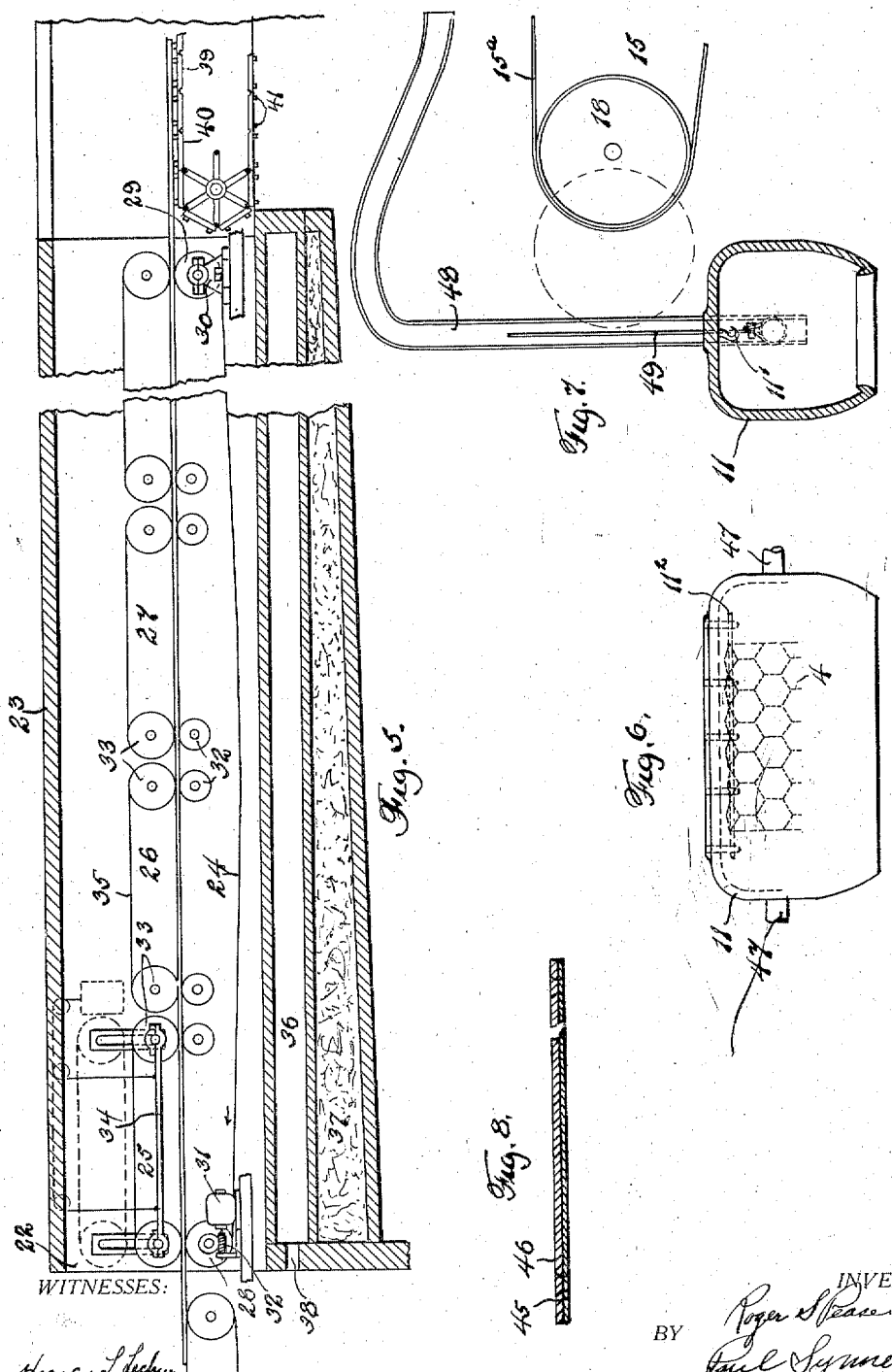

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

METHOD OF MAKING WIRE-GLASS.

1,259,772.   Specification of Letters Patent.   Patented Mar. 19, 1918.

Application filed June 21, 1912. Serial No. 705,032.

*To all whom it may concern:*

Be it known that I, ROGER S. PEASE, a citizen of the United States, residing at Pittsburgh, in the county of Allegheny and State of Pennsylvania, have invented certain new and useful Improvements in Methods of Making Wire-Glass, of which the following is a specification.

This invention has reference to a method of and apparatus for making wire glass and it has for its objects, the provision of an improved method of drawing wire glass; the provision of an improved method whereby wire glass may be drawn from a body of molten glass with the wire properly embedded in the glass; the provision of an improved method whereby a glass covering for the wire is formed out of contact with the wire and then welded over the wire; the provision of an improved method of drawing wire glass continuously; and the provision of improved apparatus for carrying out the method herein described. These, together with such other objects as hereinafter appear or are incidental to my invention I attain by means of a construction which I have illustrated in preferred form in the accompanying drawings wherein:—

Figure 1 is a section through an extension or dog house of a glass furnace showing the application of my improved mechanism; Fig. 2 is a similar section of a slightly modified arrangement of dog house and illustrates the wire feeding mechanism and air supply; Fig. 3 is a transverse section through the central portion of Fig. 2; Fig. 4 is a plan view of the apparatus shown in Fig. 1; Fig. 5 is a longitudinal section through an annealing leer which constitutes a part of my invention; Figs. 6 and 7 are respectively a section and side elevation of the glass drawing bait employed; Fig. 8 is a cross section through a portion of a conveyer belt utilized in carrying out my invention.

In carrying out my invention, I propose to draw the glass covering from a body of molten glass and weld the same about the wire fabric as the drawing proceeds, thus constituting the process in effect a continuous one. I further propose to anneal the sheet of glass thus formed in a leer while the drawing operation continues. My improved method of forming wire glass will be better understood from a description of the apparatus which I employ.

Referring to Fig. 1 of the drawing, it will be seen that I have shown in cross section a dog-house 1, provided with a central drawing orifice 2 from which the glass covering 3 for the wire fabric 4 is drawn. Located beneath the dog-house is an airtight chamber $1^a$ into which air under pressure sufficient for the drawing operation is admitted through the pipe $1^b$. Mounted in the bottom portion of the dog-house and projecting up through the orifice 2 is a hollow standard or core 5 which is of an extended flat shape and opens into the chamber $1^a$ as clearly appears from an inspection of Figs. 1 and 3. This standard is located within an apparatus which I designate as an air pot or ring and which comprises fixed members or pedestals 6 above which floats the air drawing ring 7, the walls of which have an annular groove or recess 8 into which the members 6 are adapted to project. The members 6 and the core 5 are both removably mounted on the bottom of the dog house so that they may be readily repaired or replaced. With this end in view I have provided asbestos packing between adjacent surfaces and provided an overhead traveling crane with which to move the said parts (see Fig. 1). The members 6 are provided with air ports 9 opening into the recess 8 of the drawing ring and connected by the pipe $9^a$ to any desired source of fluid pressure, the ports being closed by means of ball valves 10. When the glass covering is being drawn, air pressure is admitted to the annular cavity 8 in the drawing ring 7 and elevates the drawing ring until it comes in contact with the upper wall or cover of the dog-house, thus cutting off the heat and gas flames in the dog house from the glass covering as it is being drawn. The glass covering is in effect a bubble or tubular body of glass and is formed by immersing a bait 11 in the glass in the usual manner and thereafter elevating the bait, whereupon a tubular member is drawn from the body of the glass, air pressure from the chamber $1^a$ being supplied to the interior of the tube through the cavity 5' in the standard 5. The bait 11 is provided with a plurality of hooks 11' and a rod 11" is hung from the hooks after it has been first run through the meshes in the end of the wire fabric. This affords a simple and secure means for fastening the fabric to the bait. From inspection of Fig. 2, it will be seen that the wire fabric is rolled about a drum 12 carried on a carriage 13 located in the chamber 1ᵃ beneath the dog house. The fabric passes from the drum through a pair of rollers 14 which are driven by a motor 14ᵃ and serve to flatten out any irregularities in the wire, to the standard 5, the end of the wire fabric being fastened in position within the bait as above pointed out. From the foregoing, it will be apparent that the tubular glass covering 3 will be drawn from the glass in the dog house about the wire fabric 4 but out of contact therewith.

In order to weld the covering over the wire fabric, I provide the following mechanism: Located opposite to each other on either side of the drawing orifice 2 are a pair of trucks or carriages 15 and 16 which are adapted to travel on the tracks 17. Each truck is provided with a pair of rolls 18 which carry a belt 19, the rolls being turned by means of electric or any other preferred type of motor 20 at the same rate of speed as that of the bait. The belts are driven in opposite directions as indicated by the arrows in Fig. 1 and are tightened by means of any preferred form of belt-tighteners 21. The trucks are moved backward and forward by means of motors not shown, and when the glass covering 3 is being first drawn, the trucks are retracted from the orifice in order to permit the passage of the bait and the tubular glass covering being drawn thereby. After the bait has been elevated a sufficient distance to clear the trucks, the latter are advanced to the position indicated in Fig. 1 and the bait is drawn off toward the right on the belt of the carriage 15 by a cable as will hereinafter further appear.

The operation of the apparatus thus far described is as follows: The carriages are first retracted and the bait 11 supported on the truck 15, or otherwise as may be desired, and the fabric 4 is secured in place in the bait which is then lowered into the drawing orifice 2 and partially immersed in the glass in the dog house. The bait is then elevated a sufficient distance to clear the trucks 15 and 16 which are advanced until the rolls press together the sides of the tubular member drawn by the bait and weld them over the wire fabric. The bait is then moved to the right by a cable and draws with it the glass sheet formed by the action of the rollers and belts of the trucks, the tubular covering 3 being continuously drawn as the bait moves. It is to be noted that while the rolls 18 are the positive means for pressing the sides of the tubular member together, the sheet is directly formed between the conveyer belts on the carriages and is carried on the belt 15ᵃ of the carriage 15. This provides a simple and effective means of handling the sheet of glass.

Located immediately adjacent the outer end of the truck 15 is the receiving opening 22 of an annealing leer 23 in which the sheet of glass is annealed as it is being drawn therethrough. The glass sheet is supported in the leer between oppositely disposed conveyer belts, the lower belt 24 extending substantially the entire length of the leer, the upper belt being preferably composed of a plurality of sections 25, 26, 27, etc., as will appear from inspection of the Fig. 5. The lower belt 24 is carried on the rolls 28, 29, the bearing 30 of the roll 29 being adjustable longitudinally in order to provide means for tightening the belt. The axle of the roll 28 is driven by a motor 31 through a worm gear 32 and imparts movement to the belt 24 in the direction of the arrow. Located between the rolls 28, 29, are a plurality of idler rolls 32 which prevent sagging of the upper part of the belt which would result in breakage of the glass sheet. It will be apparent that the roll 29 as well as any of the intermediate rolls 32 may also be driven, if desired, or that a plurality of belts and rolls may be provided for the lower conveyer member as well as the upper. The upper sections are each comprised of two rolls 33 mounted in suitable framework 34 and carrying a belt 35. The framework 34 is mounted in such manner in the body of the leer that it can be elevated to the position indicated in dotted lines in Fig. 5 in order to permit the passage of the bait 11. At the beginning of a drawing operation, all of the upper sections are moved to the raised position indicated and are successively lowered as the bait passes them until the belts 35 engage the upper surface of the glass sheet being carried on the lower belt.

The leer may be of any desired construction, but is preferably provided with a plurality of heating flues 36 which extend longitudinally of the leer beneath the conveyer mechanism. Located beneath the flues 36 are a number of receptacles containing heat storage material 37 such as broken brick and sand, the depth of such material decreasing toward the discharge end of the leer in order to secure and maintain proper gradation of temperature within the leer. Heat is supplied to the heating flues 36 by burners located at 38. The purpose in conducting the sheet of glass between two conveyer belts is to prevent air drafts from coming into contact with the surfaces of the glass, thereby insuring proper annealing of the glass in the leer and preventing breakages. Located immediately adjacent the outer ends of the conveyer belts in the leer in position to receive the glass sheet is a link belt conveyer 39 which comprises a moving belt 40 having transversely disposed tread members 41 which are spaced apart at desired intervals. The treads afford a substantial base portion upon which the glass sheet may be cut into sections without liability of breakage.

In order to prevent cooling of the glass before it is carried into the annealing leer, I provide the truck 15 with a copper plate 42 through which extend a plurality of steam pipes 43 by means of which the plate and the glass are heated. The plate 42 also serves the additional purpose of providing a platform or support for the belt 19, such support being required in order to prevent breakage or buckling of the glass as it is being flattened and smoothed out by the block 44 which when the necessity therefor arises is moved back and forth across the glass sheet as it is being drawn toward the annealing leer. This block is preferably composed of bass-wood boiled in a solution of borax. Bass-wood, when so treated, will char but will not readily burn with a flame and has been found to be particularly advantageous for the purpose indicated.

Referring to Fig. 8, it will be seen that the conveyer belts are comprised of a body portion 45 which is preferably copper and of an outer sheet or covering member 46 which is preferably composed of asbestos or similar flexible refractory material, riveted, or otherwise secured to the copper plate. This construction has been found to give the desired strength and refractory qualities found most suitable to secure the proper annealing of the glass.

Assuming, now, that the wire fabric has been secured to the bait and a tubular covering member drawn by the bait, and that the bait has been turned at right angles and is being drawn along with the belt 19 of the truck 15, the covering member and wire fabric having been welded into a sheet of wire glass, the operation is as follows:

The bait is drawn into the annealing leer, drawing with it the sheet of glass which is first flattened out if desired on the truck 15 by the block 44 and then carried between the various belts throughout the length of the annealing leer. When the bait is drawn through the length of the leer and reaches the link belt conveyer, it may be cut off, the frictional hold of the conveyer belts on the sheet of glass being carried between them being sufficient to carry the sheet along and continue the drawing operation which occurs in the dog house.

From the foregoing description, it will be apparent that in following out my improved method, I form the glass covering for the wire fabric about the fabric but out of contact therewith, and then weld the sides of the covering over the wire fabric in the form of a sheet, after which the sheet is drawn off at right angles, is flattened and smoothed out if necessary and maintained at proper temperature and carried into the annealing leer, in which air is excluded from the surface of the glass. After the sheet of glass has been carried through the leer and has been properly annealed, it is cut off into sections at the discharge end of the leer and can be placed where desired. The operation is thus in a sense a continuous one, the sheet being continuously drawn and carried into an annealing leer as it is being formed, and then cut off in sections at the discharge end of the leer after it has been properly annealed.

The advantages of my invention reside chiefly in the great reduction of the cost of production, which results not only from the simplicity of and the continuous character of the operation, but also from obviating the necessity of grinding and polishing which is the major item of expense in the formation of wire glass by the casting processes in current use. By drawing the glass, the sheet will be transparent and there will be little or no occasion for any grinding and polishing.

Referring now to Figs. 6 and 7, it will be seen that the bait 11 is provided with trunnions 47 which are adapted to engage tracks 48 which preferably have the form of a channel iron in cross section, the flanges serving as guides for the trunnions thus controlling the direction of movement of the bait. From inspection of Fig. 7 it will be noted that the bait is first moved upwardly a sufficient distance to clear the rolls and then deposited on the conveyer belt 15ᵃ of the carriage 15, after which it is drawn into the leer. The preferred means of drawing the bait is a cable 49 such as that shown in Fig. 7, which cable is fastened in any suitable manner to the trunnions and which may be supported from the traveling crane, or otherwise, when the initial movement of the drawing operation occurs.

It will be understood that I have diagrammatically illustrated apparatus for carrying out my invention and that different forms of mechanism could be utilized without departing from the spirit of the invention. It will also be apparent that other types of wire material than the one shown can be employed, and that the term wire fabric in the claims is used in its broad sense and covers any form of material suitable for the purpose.

Having thus described my invention and illustrated its use what I claim as new and desire to secure by Letters Patent is the following:—

1. The herein described process of making wire glass, which consists in drawing the glass in hollow cylindrical form surrounding the wire, and then in flattening the cylinder to embed the wire between the walls of the cylinder.

2. The herein described process of making wire glass, which consists in drawing the glass in hollow cylindrical form surrounding the wire, then pressing the sides of the cylinder together with the wire between, and then in annealing the sheet out of contact with the atmosphere.

3. The herein described process of making wire glass, which consists in drawing a covering member for the wire fabric, in welding the covering and fabric into sheet form, and then in annealing the sheet with both faces out of contact with the air.

In testimony whereof I have hereunto signed my name in the presence of the two subscribed witnesses.

ROGER S. PEASE.

Witnesses:
ARTHUR SYNNESTVEDT,
ARCHWORTH MARTIN.